US008295219B2

(12) United States Patent
Moon

(10) Patent No.: US 8,295,219 B2
(45) Date of Patent: Oct. 23, 2012

(54) MECHANISM FOR WIRELESS MULTICAST

(75) Inventor: Billy Gayle Moon, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 930 days.

(21) Appl. No.: 11/968,413

(22) Filed: Jan. 2, 2008

(65) Prior Publication Data

US 2009/0168681 A1 Jul. 2, 2009

(51) Int. Cl.
*H04H 20/71* (2008.01)

(52) U.S. Cl. .......................................... 370/312

(58) Field of Classification Search .................. 370/252, 370/253, 312, 389, 390, 432
See application file for complete search history.

(56) References Cited

U.S. PATENT DOCUMENTS 6,925,431 B1 * 8/2005 Papaefstathiou ................ 703/17
2004/0202164 A1 * 10/2004 Hooper et al. ................ 370/390
2005/0123058 A1 * 6/2005 Greenbaum et al. ..... 375/240.28
2005/0259584 A1 * 11/2005 Chen et al. .................... 370/238
2006/0146745 A1 7/2006 Cai et al.
2007/0201413 A1 8/2007 Laine et al.
2007/0268900 A1 * 11/2007 Park et al. ..................... 370/390
2008/0062867 A1 * 3/2008 Lee et al. ....................... 370/230
2008/0089268 A1 * 4/2008 Kinder et al. ................. 370/315
2008/0137682 A1 * 6/2008 Kish et al. ..................... 370/432
2008/0225771 A1 * 9/2008 Guo et al. ..................... 370/312
2008/0273458 A1 * 11/2008 Guo et al. ..................... 370/229
2009/0161590 A1 * 6/2009 Lewis et al. .................. 370/312

FOREIGN PATENT DOCUMENTS

WO WO 2005/117345 12/2005
WO WO 2007/092918 8/2007

OTHER PUBLICATIONS

International Search Report for International Application No. PCT/US2008/088598 dated Mar. 6, 2009.
Written Opinion for International Application No. PCT/US2008/088598 dated Mar. 6, 2009.

* cited by examiner

*Primary Examiner* — Ricky Ngo
*Assistant Examiner* — Wei-Po Kao
(74) *Attorney, Agent, or Firm* — Tucker Ellis LLP

(57) ABSTRACT

A system including a wireless transceiver receives multi-destination packets. The received multi-destination packets are sent either as multicast packets, replicated and sent as unicast packets to each member of a multicast group or both. Control logic of the system determines whether to send the received multi-destination packets as multicast packets or as replicated unicast packets based on which technique achieves higher throughput and/or lower latency.

20 Claims, 3 Drawing Sheets

400
DETERMINE POPULATION OF GROUP 402
DETERMINE UNICAST THROUGHPT RATE 404
UNICAST > MULTICAST ? 406
YES
SEND UNICAST 408
NO
SEND MULTICAST 410

MECHANISM FOR WIRELESS MULTICAST

TECHNICAL FIELD

The present disclosure relates generally to wireless communication, such as wireless multicast communication.

BACKGROUND

In a wireless network, such as an Institute of Electrical and Electronics Engineers (IEEE) 802.11 network, wireless stations associate with an access point to communicate on the network. A wireless device may send and/or receive unicast packets (packets for the station only) or multicast packets (packets for a group of wireless devices that include the wireless device). Selecting the appropriate data rate for multicast packets can be problematic. For example, the data rate for unicast packets can be a function of the link between the access point and wireless device. A wireless device that is in close range of the access point may send and/or receive unicast packets at 54 Mbps (Megabyte per second) while another wireless device farther away from the access point may send and/or receive unicast packets at 11 Mbps. Thus, a data rate must be selected for sending multicast packets to be sent. The 802.11 standard solution for this dilemma is to select a default multicast rate, for example 1 Mbps, which may not be the most efficient rate. Another method for sending multicast packets comprises replicating each multicast packet and sending a unicast packet to each host at an optimal rate for that host.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment, a system in which multi-destination packets are sent either as multicast packets or replicated and sent as unicast packets to each member of a multicast group. Determining whether to send multicast packets or replicated unicast packets can be based on which technique achieves higher throughput and/or lower latency.

In accordance with an example embodiment, there is disclosed herein an apparatus comprising a wireless transceiver configured to wirelessly communicate with a plurality of recipients, and control logic coupled to the wireless transceiver and operable to send data via the wireless transceiver. The control logic is configured to determine an amount of bandwidth for sending a multi-destination packet directed to a multicast group as a single multicast packet. The control logic is also configured to determine an amount of bandwidth for sending the multi-destination packet to each member of the multicast group individually as a unicast packet. The control logic sends the multicast packet as a single multicast packet responsive to determining a single multicast packet would use less bandwidth than sending the unicast packets to each member of the multicast group individually. The control logic sends the multicast packet as unicast packets to each member of the multicast group responsive to determining the unicast packets use less bandwidth than sending a multicast packet.

In an example embodiment, there is disclosed herein an apparatus comprising a transceiver configured to communicate with a plurality of recipients, and control logic coupled to the wireless transceiver and operable to send data via the wireless transceiver. The control logic is configured to send a multicast packet to a first group of recipients at a first rate and to send the multicast packet to a second group of recipients at a second rate.

In an example embodiment, there is disclosed herein a method comprising determining an amount of bandwidth for sending a multi-destination packet directed to a multicast group as a single multicast packet, and determining an amount of bandwidth for sending the multi-destination packet to each member of the multicast group individually as a unicast packet. The multi-destination packet is sent as a multicast packet responsive to determining a multicast packet uses less bandwidth than sending the multi-destination packet as unicast packets to each member of the multicast group individually. The multicast packet is sent to each member of the multicast group individually responsive to determining the unicast packets use less bandwidth than sending a multicast packet.

In an example embodiment, there is disclosed herein a method that comprises dividing a multicast group into a first set and a second set of recipients. A multicast packet is sent to the first set of recipients at a first data rate. The multicast packet is also sent to the second set of recipients at a second data rate.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
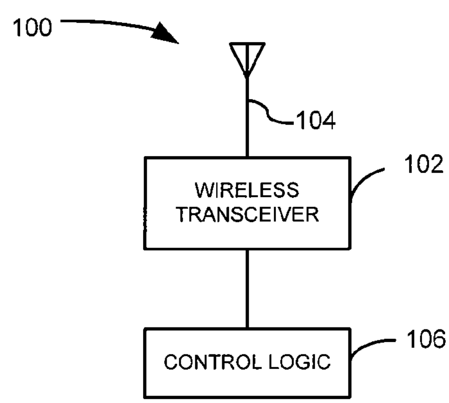
FIG. 1 is an example of a wireless device configured in accordance with an example embodiment.

This description provides examples not intended to limit the scope of the appended claims. The figures generally indicate the features of the examples, where it is understood and appreciated that like reference numerals are used to refer to like elements.

In an example embodiment, there is disclosed herein a method for sending a multi-destination packet that dynamically selects between the two modes of operation based on throughput calculations. The simplest calculation could just be based on population. For example, if the average host H1 of multicast group G1 is associated with AP1 at rate X where X is 54 Mbps, however the "default" multicast speed is 1 Mbps, then so long as there are fewer than 54 members in set H1, then sending unicast copies of a packet P to each host H1(*i*) at their unicast rate would be faster than sending a single multicast packet; and whereas if there are more than 54 hosts in set H1, then it would be "optimal" to multicast a single copy of packet P to all hosts H1 at the same time.

In an example embodiment, rate adaptive multicast techniques can be combined with dynamically selecting between two modes of operation based on throughput calculations. In this embodiment, rather than multicasting a single packet to all hosts in set H1 at some default rate X (1 Mbps in the above example), a maximum multicast rate could be calculated for all hosts H1 and that rate is used for determining unicast vs. multicast thresholds.

In an example embodiment, packets P are "split" into multiple sets, for example unicast and multicast sets. As an example, some subset of set H1, e.g. H1(*i*) would receive packets as unicast messages and another subset, e.g. H1(*j*), would receive multicast messages. All hosts belonging to the H1(*i*) subset would receive their packets at their unicast rate (note that no new signaling messages are required to do this). Similarly, all hosts belonging to the H1(*j*) subset would received multicast packets at the system default multicast rate (again no new signaling required). Hosts would be able to determine that if their unicast signaling rate was some factor F times the multicast rate (or at or above a predetermined threshold rate), then they would be members of H1(*i*) otherwise they would be members of H1(*j*).

FIG. 1 is an example of a wireless device 100 configured in accordance with an example embodiment. Wireless device 100 comprises a wireless transceiver 102 configured to wirelessly communicate with a plurality of recipients through antenna 104. Control logic is coupled to the wireless transceiver and operable to send data via the wireless transceiver. "Logic," as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Control logic 106 may be co-located with the wireless transceiver or may be at a remote location. For example, a Lightweight Access Point Protocol (LWAPP) compatible access point, available from Cisco Systems, Inc., 170 West Tasman, San Jose, Calif., may employ control logic 106 that is located at a centralized switch and/or controller that is in communication with wireless transceiver 102.

Control logic 106 dynamically selects whether to send a multi-destination packet as a multicast packet directed to the multicast group or as unicast packets directed to each member of the group individually. Control logic 106 is configured to determine an amount of bandwidth for sending the multi-destination packet as a multicast packet directed to the multicast group. Control logic 106 is also configured to determine an amount of bandwidth for sending the multi-destination packet to each member of the multicast group individually as a unicast packet. Control logic 106 sends the multi-destination packet as a single multicast packet responsive to determining a single multicast packet would use less bandwidth than sending the multi-destination packet as a unicast packet to each member of the multicast group individually. Control logic 106 sends the multi-destination packet as unicast packets to each member of the multicast group responsive to determining that unicast packets use less bandwidth than sending a multicast packet.

For example, if the multicast data rate for an 802.11 network is set to 1 Mbps, which is the normal default for an 802.11 network, then the total system capacity may be greatly reduced by sending multicast packets. For example, a 256 Kbps video stream would occupy 25% of the spectrum. Assuming that the stream is shared by 6 multicast subscribers, those 6 subscribers would be using a little over 25% of the network's capacity by receiving the video stream as a multicast stream. If for example, the video stream was replicated and sent as a unicast stream to the subscribers, less capacity would be used. For example, if all subscribers were associated at 54 Mbps for unicast traffic, sending six copies of the video stream at 54 Mbps would only consume 6/54 or just over 11% of the spectrum. Thus, in this example it would be twice as efficient to send the video stream as unicast traffic over the wireless link than it would be if the video stream was sent as a multicast stream.

In an example embodiment, control logic 106 is configured to determine the amount of bandwidth for sending the multi-destination packet as a multicast packet based on a default multicast rate (for example 1 Mbps in the above example). The members of the multicast group may have the same unicast rate (for example a default unicast rate of 54 Mbps) or the members of the multicast group may have different unicast data rates. For example, a wireless device near the access point may have a unicast rate of 54 Mbps, whereas a wireless device further away from the access point may have a unicast of 11 Mbps. Control logic 106 determines the unicast bandwidth for each wireless device based on the unicast rate for the wireless device.

In an example embodiment, control logic 106 is configured to determine a minimum rate for all recipients of the multi-destination packet. Control logic 106 determines the amount of bandwidth for sending the multicast packet as a single multicast packet based on the minimum rate. As stated herein supra, each member of the multicast group may have the same unicast rate, or the members of the multicast group may have different unicast rates.

In an example embodiment, control logic 106 is configured to send a multicast packet to a first group of recipients at a first rate and to send the multicast packet to a second group of recipients at a second rate. This embodiment can be useful in situations where there may be a benefit to sending the multicast packet twice For example, a video stream at 1.5 Mbps may be sent as a high quality stream to devices capable of receiving 54 Mbps (either as a unicast or multicast stream) and as a low quality, e.g. 1 Mbps, stream to devices that are unable to receive the high quality stream. As another example, for video surveillance the stream can be sent in real-time to a monitoring station while being sent non-real time to an archiving device.

In an example embodiment, control logic 106 sends the multicast packet to the first group of recipients as unicast packets addressed to each member of the group. Control logic 106 can determine that each recipient in the first group of recipients has a unicast rate of at least a predetermined threshold. Control logic 106 can send the unicast packet to each member of the group at a rate equal to the predetermined threshold. In another example embodiment, control logic 106 sends the unicast packet to each member of the group at a highest available throughput rate for each individual recipient of the first group.

Figure 2:
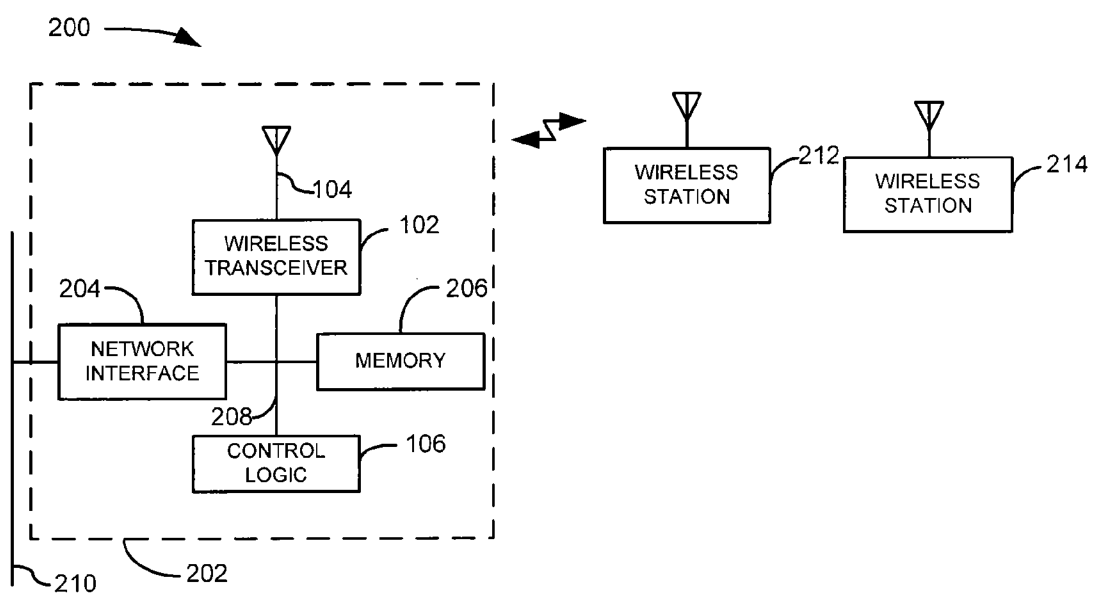
FIG. 2 is an example of a network employing an access point configured in accordance with an example embodiment.

FIG. 2 is an example of a network 200 employing an access point 202 configured in accordance with an example embodiment. Access point 202 further comprises a network interface 204 and memory 206. Bus 208 enables communication between wireless transceiver 102, control logic 106, network interface 204 and memory 206. Network interface 204 is coupled to a network 210. Network 210 can be any type of network such as a distribution network, a Local Area Network (LAN), a Mesh Network, and/or the Internet. Wireless transceiver 102 is capable of exchanging wireless signals with wireless stations 212, 214. Although two wireless stations 212, 214 are illustrated in this example, this should not be construed as limiting the example embodiment to two wireless stations, as this number was selected for ease of illustration and those skilled in the art can readily appreciate that any physically realizable number of wireless stations may be connected to an access point configured as will be described herein for access point 202.

In operation, network interface 204 receives a multi-destination packet for wireless stations 212, 214 from network 210. The multi-destination packet is forwarded to memory 206 via bus 208. Control logic 106 determines whether to send the multi-destination packet as a multicast packet to wireless stations 212, 214 or whether to send unicast packets to each of wireless station 212 and wireless station 214. Control logic 106 then forwards the multi-destination packet (and, if sending in unicast, replicated copies of the multi-destination packet are also forwarded) from memory 206 to wireless transceiver 104 for transmission.

In an example embodiment, control logic 106 determines the bandwidth for sending the multi-destination packet as a multicast packet against the bandwidth for sending the multi-destination packet as unicast packets to each wireless station 212, 214. In a particular embodiment, the multicast rate is the default multicast rate and the unicast rate is the same for wireless stations 212, 214. In this embodiment, determining whether to send the packet as multicast or unicast is simply a matter of determining how many wireless stations are involved. For example, if the unicast rate for wireless stations is 54 Mbps and the default multicast rate is 1 Mbps, it is more efficient to send the multi-destination packet as a unicast packet to each wireless station 212, 214. Ideally, if the unicast rate is 54 Mbps sending, it is more efficient to send the multi-destination packet as a unicast packet if there are less than 54 wireless stations; however, this ignores contention times which would need to be factored in the calculation for an 802.11 compatible network, or any network that requires waiting a time period for a channel to be clear before sending a packet, so the actual number of unicast packets that can be sent more efficiently than a multicast packet at the default rate may be slightly less.

In another example embodiment, the unicast rates of wireless stations 212 and 214 are different. For example, wireless station 212's unicast rate can be 54 Mbps while wireless station 214's unicast rate can be 11 Mbps. Control logic 106 would compute the amount of time for sending the multi-destination packet to the station at the station's current rate for deciding whether to send the multi-destination packet as a multicast packet or as a unicast packet to each member of the group.

In another example embodiment, wireless stations 212, 214 may have a multicast rate that is higher than the default (for example 1 Mbps) multicast rate. In this embodiment, control logic 106 uses the higher multicast rate in determining whether to send the multi-destination packet as a multicast packet to wireless stations 212, 214 or as a unicast packet to each wireless station 212 and wireless station 214. For example, control logic 106 may use the lowest (minimum) unicast rate of wireless stations 212, 214 for determining the multicast rate.

In an example embodiment, wireless station 212 comprises a plurality of wireless stations operating at a first rate and wireless station 214 comprises a plurality of wireless stations operating at a second rate. The first and second rates may be either multicast rates and/or unicast rates. Control logic 106 has wireless transceiver 102 send the multi-destination packet at least twice, once at the first rate and again at the second rate. If the first and/or second rate is a multicast rate, control logic may determine whether less bandwidth would be used by sending the packets as a unicast packet to the members of either the first and/or second groups.

In this embodiment, control logic 106 would not have to explicitly assign wireless stations to a group. The wireless station can determine whether it can receive at the first rate, and (assuming for this example the first rate is the higher rate) if the wireless station is not able to accept the packet at the first rate then the station belongs to the second rate. Control logic 106 is also able to make the same determination, for example based on each station's unicast rate control logic 106 can determine the highest rate a wireless station can receive data.

Figure 3:
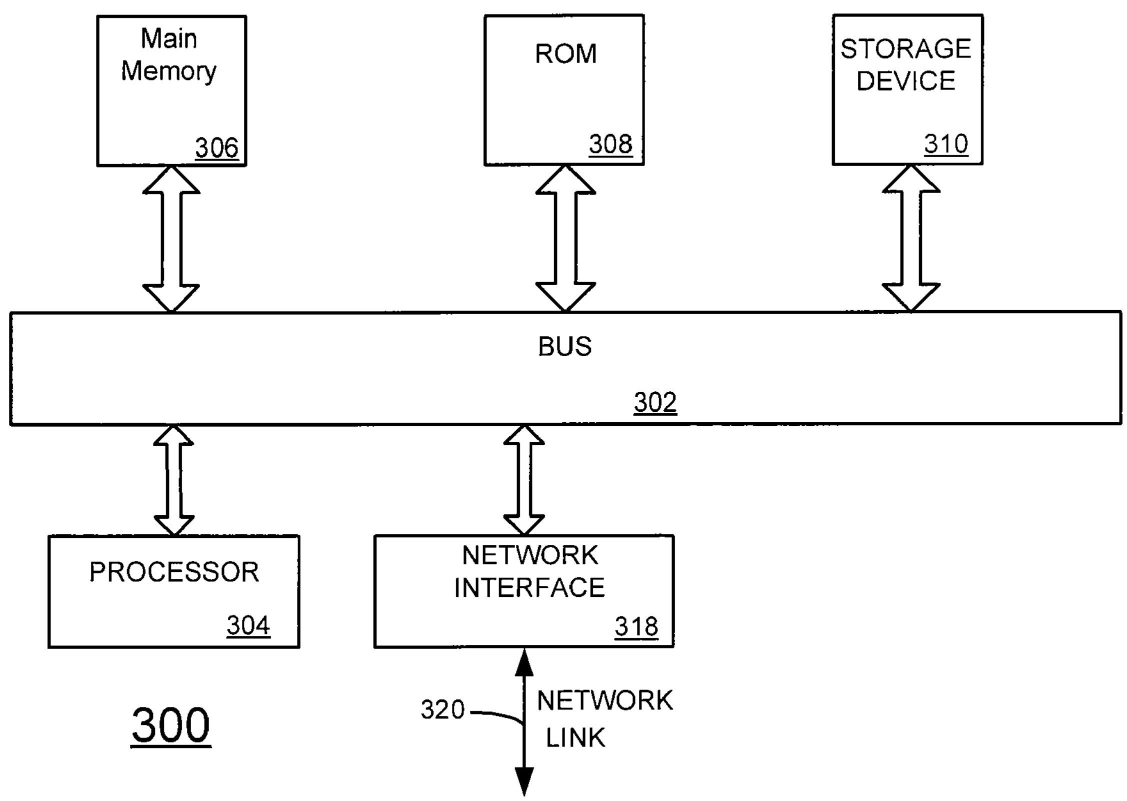
FIG. 3 illustrates an example of a computer system upon which an example embodiment may be implemented.

FIG. 3 illustrates an example of a computer system 300 upon which an example embodiment may be implemented. Computer system 300 is suitable for implementing control logic 106 described in FIGS. 1 and 2. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for multicast transmissions. According to an example embodiment, multicast transmissions are provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a network interface 318 coupled to bus 302. Network interface 318 provides a two-way data communication coupling computer system 300 to a network link 320 that is connected to a network. For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

Bus 302 may also couple computer system 300 to a wireless transceiver (not shown), such as wireless transceiver 102 in FIGS. 1 and 2. In this manner, processor 304 may forward packets to the wireless transceiver for transmission. In an example embodiment, a multi-destination packet for transmission is received by network interface 318 from link 320. The multi-destination packet is moved along bus 302 to main memory 306. Processor 304 then determines whether to send the packet as a multicast packet or as multiple unicast packets. If sending the multi-destination packet as a multicast packet, processor 304 can append (or insert data in) an appropriate header and forward the packet to the wireless transceiver on bus 302. If sending the multi-destination packet as a unicast packet to each member (or a subset) of the group, processor 304 can replicate the multi-destination packet and append (or insert data in) appropriate headers.

Figure 4:
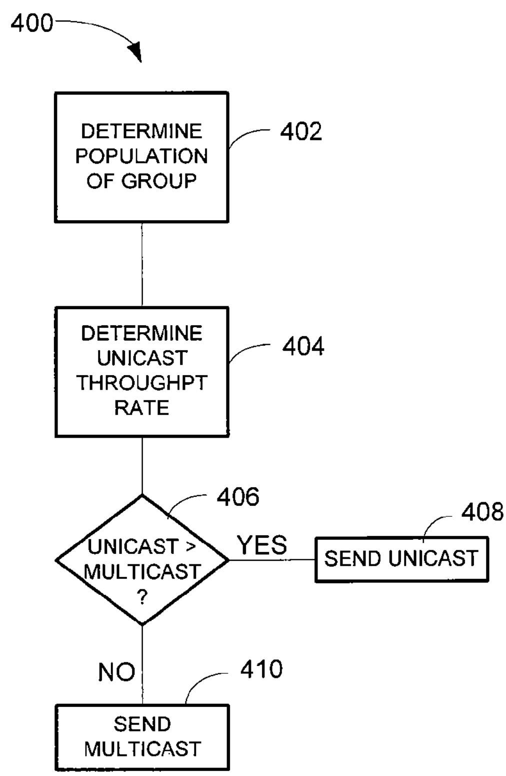
FIG. 4 illustrates an example of a methodology that dynamically selects between unicast and multicast modes for sending a multi-destination packet using a default multicast throughput rate.
Figure 5:
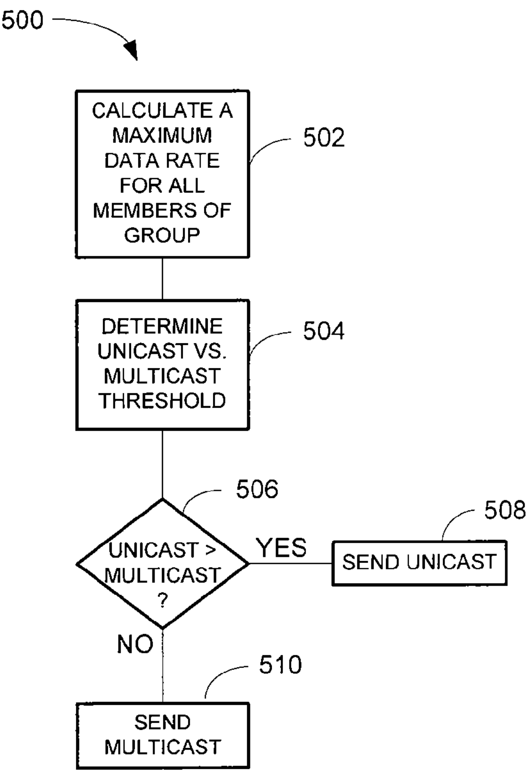
FIG. 5 illustrates an example of a methodology that dynamically selects between multicast and unicast frames after determining a maximum multicast rate for is all recipients.
Figure 6:
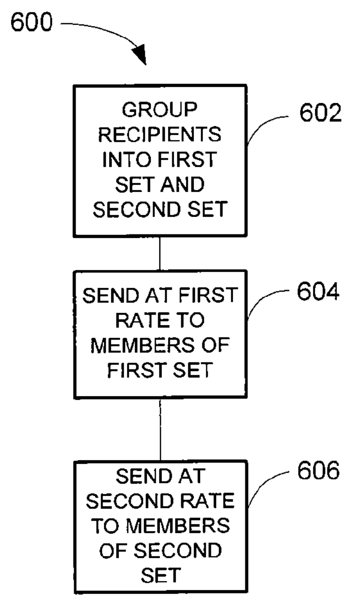
FIG. 6 illustrates an example of a methodology that sends a multicast at a first rate to a first set of recipients and at a second rate to a second set of recipients.

In view of the foregoing structural and functional features described above, methodologies in accordance with example embodiments will be better appreciated with reference to FIGS. 4-6. While, for purposes of simplicity of explanation, the methodologies of FIGS. 4-6 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of the example embodiment. The methodologies described herein are suitably adapted to be implemented in hardware, software, or a combination thereof.

FIG. 4 illustrates an example of a methodology 400 that dynamically selects between unicast and multicast modes for sending a multi-destination packet using a default multicast throughput rate. At 402, the population of the group is determined. This may be as simple as taking a count. In another example embodiment, in addition to determining the number of members of the group, the throughput rate for each member of the group is determined.

At 404, the amount of bandwidth for sending the multi-destination packet to each member of the multicast group individually as a unicast packet is calculated. In an example embodiment where all of the stations are at the same unicast rate, calculating the throughput is matter of dividing the throughput rate by number of stations (e.g. 54 Mpbs/# recipients). In another example embodiment where the receivers have different unicast rates, the time is calculated for sending a unicast packet to each station, and then a sum of the times for sending a unicast packet to each station is determined.

At 406, the bandwidth for sending the multi-destination packet as a multicast packet is compared to the bandwidth for sending the multi-destination packet as a plurality of unicast packets. In determining the bandwidth for sending a multicast packet, the calculation may be performed using the default multicast rate, or a minimum rate that each device is able to receive a multicast packet.

If, at 406, a determination is made that sending unicast packets to each member of the group is more efficient than sending a multicast packet (YES), at 408 the received multicast packet is sent to each individual receiver as a unicast packet. If, at 406, a determination is made that sending the multi-destination packet as a unicast packet to all members of the group uses less bandwidth (NO), at 410 the multicast packet is sent as a multicast packet.

FIG. 5 illustrates an example of a methodology 500 that dynamically selects between multicast and unicast frames after determining a maximum multicast rate for all recipients. At 502, a maximum default multicast rate that can be received by each member of the group is calculated. For example, the maximum multicast rate for the group can be the unicast rate for a member of the group with the lowest unicast rate. At 504, a threshold is determined for when to send a multi-destination message as a multicast or as unicast messages to each member of the group. The threshold can be based on the maximum multicast rate determined at 502. For example, if the unicast rate for the receivers is 54 Mbps and the maximum multicast rate is 11 Mbps, the threshold would be 5 receivers. If the group has less than five recipients, sending the group message as unicast messages to each recipient would use less bandwidth than sending a single multicast packet.

At 506, the number of recipients is compared to the threshold. If there are fewer recipients than the multicast threshold (YES), at 508 the multi-destination message is replicated and sent as unicast messages to each recipient. If, at 506, there are more recipients than the threshold (NO), at 510 the group message is sent as a multicast message.

FIG. 6 illustrates an example of a methodology 600 that sends a multi-destination message at a first rate to a first set of recipients and at a second rate to a second set of recipients. The multi-destination message may be sent as any combination of unicast/multicast messages to members of each group. For example, the group message can be sent as a unicast message to the first group and a multicast message to the second group, a multicast message to the first group and a multicast message to the second group, a unicast message to the first group and a unicast message to the second group, or a multicast message to the first group and a unicast message to the second group.

At 602, recipients of a multi-destination packet are grouped into a first set and a second set. For the purposes of this example, the first set will be a group able to receive multicast packets above a predetermined threshold (for example 11 Mpbs) and the second set comprises the remaining recipients that cannot receive at or above the predetermined threshold.

At 604, the multi-destination packet is sent to the members of the first set at the first rate. In an example embodiment, a calculation can be made as described herein to determine whether sending the multi-destination packet as unicast packets to each member of the set would use less bandwidth than sending a multicast message to all members of the set.

At 606, the multi-destination packet is sent to members of the second set at a second rate. A calculation can be made as described herein to determine whether to send the multi-destination packet as unicast packets to each member of the set or to send the multi-destination packet as a multicast packet.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:

a wireless transceiver configured to wirelessly communicate with a plurality of recipients;

control logic coupled to the wireless transceiver and operable to send data via the wireless transceiver;

wherein the control logic is configured to determine an amount of bandwidth for sending a multi-destination packet directed as a multicast packet to a multicast group comprising at least two members;

wherein the control logic is configured to determine, based on at least two different unicast rates of the at least two members comprising the multicast group, an amount of bandwidth for sending the multi-destination packet as unicast packets to each of the at least two members of the multicast group individually, the amount of bandwidth including a time period for a channel to be clear before sending a packet; and wherein the control logic sends the multi-destination packet as unicast packets to each of the at least two members of the multicast group at a highest available throughput rate for each individual recipient of the multicast group responsive to determining the unicast packets would use less bandwidth than sending a single multicast packet to the multicast group.

2. The apparatus of claim 1, wherein the control logic is configured to determine the amount of bandwidth for sending the multi-destination packet as a multicast packet based on a default multicast rate.

3. The apparatus of claim 2, wherein each member of the multicast group has the same unicast rate.

4. The apparatus of claim 2, wherein at least two members of the multicast group have a different unicast rate; and wherein the control logic is configured to determine an amount of bandwidth for sending the multi-destination packet to each member of the multicast group individually as a unicast packet based on each individual member's unicast rate.

5. The apparatus of claim 1, further comprising the control logic configured to determine a minimum rate for all recipients of the multi-destination packet; and wherein the control logic is configured to determine the amount of bandwidth for sending the multi-destination packet as a multicast packet based on the minimum rate.

6. The apparatus of claim 5, wherein each member of the multicast group has the same unicast rate.

7. The apparatus of claim 5, wherein at least two members of the multicast group have a different unicast rate; and wherein the control logic is configured to determine an amount of bandwidth for sending the multi-destination packet to each member of the multicast group individually as a unicast packet based on each individual member's unicast rate.

8. An apparatus, comprising:

a transceiver configured to communicate with a plurality of recipients;

control logic coupled to the wireless transceiver and operable to send a multicast stream via the wireless transceiver to members of a multicast group;

wherein the control logic determines a first set of members of the multicast group for receiving the multicast stream at a first rate and a second set of members for receiving the multicast stream at a second rate;

wherein the control logic is configured to send the multicast stream in series to the members of the multicast group twice by:

sending the multicast stream at a first quality to the first set of recipients at the first rate; and, sending the multicast stream at second quality to the second set of recipients at the second rate;

wherein the first quality is different than the second quality; and, wherein at least one of the first and second rate is at least a threshold rate, and the other of the first and second rate is below the threshold rate.

9. The apparatus of claim 8, wherein the control logic sends the multicast packet to the first group of recipients as unicast packets addressed to each member of the group.

10. The apparatus of claim 9, wherein each recipient in the first group of recipients has a unicast rate of at least a predetermined threshold; and wherein the control logic is configured to send the unicast packet to each member of the group at a rate equal to the predetermined threshold.

11. The apparatus of claim 9, wherein the control logic is configured to send the unicast packet to each member of the group at a highest available throughput rate for each individual recipient of the first group.

12. The apparatus of claim 8, wherein the multicast stream is a video stream.

13. A method, comprising:

determining an amount of bandwidth for sending a multi-destination packet directed to a multicast group as a multicast packet, wherein the multicast group comprises at least two members;

determining, based on at least two different unicast rates of the at least two members comprising the multicast group, an amount of bandwidth for sending the multi-destination packet to each of the at least two members of the multicast group individually as a unicast packet, the amount of bandwidth for sending the multi-destination packet to each of the at least two members of the multicast group includes a time period for a channel to be clear before sending a packet; and sending the multi-destination packet as unicast packets to each of the at least two members of the multicast group at a highest available throughput rate for each individual member of the multicast group responsive to determining the unicast packets would use less bandwidth than sending the multi-destination packet as a multicast packet to the multicast group.

14. The method of claim 13, further comprising sending the multi-destination packet a multicast packet to the multicast group responsive to determining the single multicast packet would use less bandwidth than sending multicast packets to each member of the multicast group individually.

15. The method of claim 13, wherein determining an amount of bandwidth for sending the multi-destination packet as a multicast packet is based on a default multicast rate.

16. The method of claim 13, wherein at least two members of the multicast group have a different unicast rate; and wherein determining an amount of bandwidth for sending the multi-destination packet to each member of the multicast group individually as a unicast packet further comprises determining an amount of throughput for sending the multi-destination packet to each member of the multicast group individually as a unicast packet based on each individual member's unicast rate.

17. The method of claim 13, further comprising the control logic configured to determine a minimum rate for all recipients of the multicast packet; and wherein determining the amount of throughput for sending the multi-destination packet as a multicast packet is based on the minimum rate.

18. The method of claim 13, wherein at least two members of the multicast group have a different unicast rate; and wherein determining an amount of bandwidth for sending the multi-destination packet to each member of the multicast group individually as a unicast packet is based on each individual member's unicast rate.

19. A method of sending a multicast stream to a plurality of wireless stations in a multicast group, the method comprising:

determining a first set of members of the multicast group that receives data at a first data rate;

determining a second set of members of the multicast group that receives data at second data rate;

sending the multicast stream to the multicast group in series at least twice by:

sending the multicast stream at a first quality to the first set of members of the multicast group at the first data rate; and sending the multicast stream at a second quality to the second set of members of the multicast data rate at the second data rate;

wherein the quality of the first quality is different than the second quality; and, wherein at least one of the first and second rate is at least a threshold rate, and the other of the first and second data rate is below the threshold rate.

20. The method of claim 19, wherein sending the multicast packet to the first set of recipients further comprises sending the multicast packet as unicast packets addressed to each member of the group.

* * * * *